United States Patent [19]
Van Marcke

[11] Patent Number: 4,726,190
[45] Date of Patent: Feb. 23, 1988

[54] PRESSURE GENERATOR WITH CHECK VALVE

[75] Inventor: Karel C. Van Marcke, Kruishoutem, Belgium

[73] Assignee: International Sanitary Ware Mfg. Cy., Kruishoutem, Belgium

[21] Appl. No.: 864,542

[22] Filed: May 19, 1986

[51] Int. Cl.$^4$ .............................................. B60T 7/00
[52] U.S. Cl. ...................................... 60/567; 60/581; 60/591; 91/6; 251/335.2; 4/407
[58] Field of Search .................. 91/6, 32, 33; 60/567, 60/581, 591; 417/511; 251/321, 335.2; 4/249, 405, 407, 408; 222/213

[56] References Cited

U.S. PATENT DOCUMENTS

| | | | |
|---|---|---|---|
| 1,374,980 | 4/1921 | Bossert | 417/511 |
| 2,267,218 | 12/1941 | Reinecke | 92/96 |
| 2,483,656 | 10/1949 | Marschalk | 222/213 X |
| 2,634,743 | 4/1953 | Audemar | 60/581 X |
| 2,857,981 | 10/1958 | Koike | 222/213 X |
| 3,811,284 | 5/1974 | Trussell et al. | 60/567 X |
| 4,304,015 | 12/1981 | Hubatka | 4/407 |

FOREIGN PATENT DOCUMENTS

| | | | |
|---|---|---|---|
| 525515 | 5/1956 | Canada | 92/96 |
| 649226 | 11/1962 | Italy | 92/90 |

*Primary Examiner*—Robert E. Garrett
*Assistant Examiner*—M. Williamson
*Attorney, Agent, or Firm*—Cahill, Sutton & Thomas

[57] ABSTRACT

On actuation, each pressure generator at each of a plurality of locations along a conduit develops a pressure rise in the conduit to energize a pressure sensitive device in fluid communication with the conduit. Each pressure generator includes a bulbous member which expels a quantity of fluid (air) into the conduit when depressed and a valve for segregating the volume defined by the bulbous member from the conduit except when the bulbous member is depressed to minimize dissipation by a nonactuated pressure generator of the pressure rise within the conduit and generated by another actuated pressure generator.

20 Claims, 5 Drawing Figures

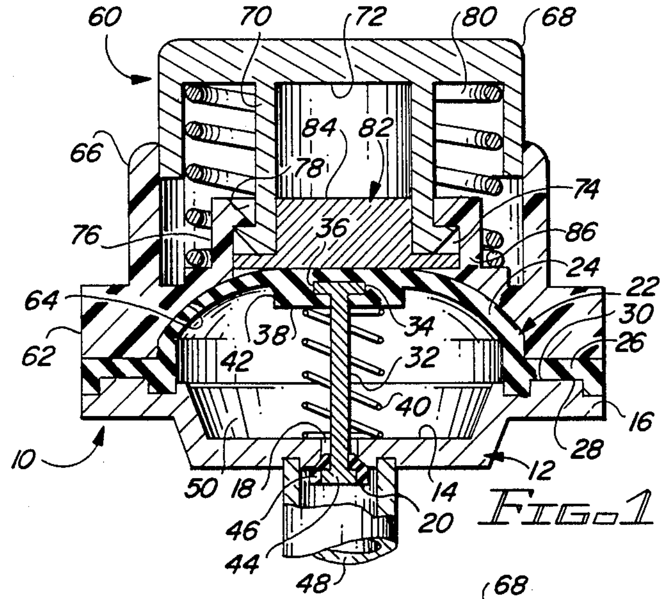
FIG-1
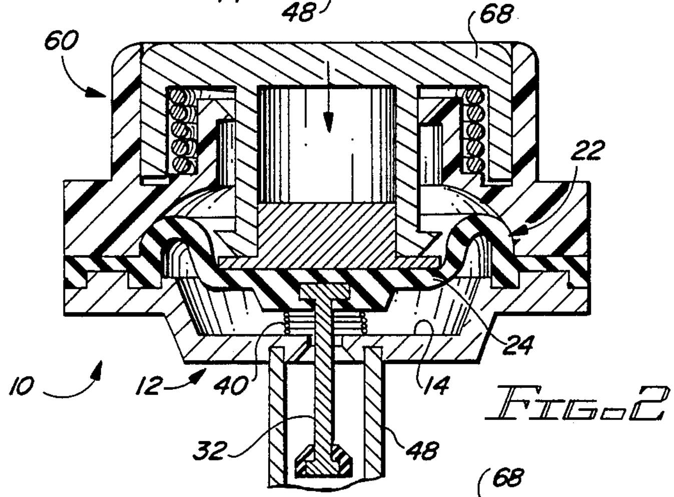
FIG-2
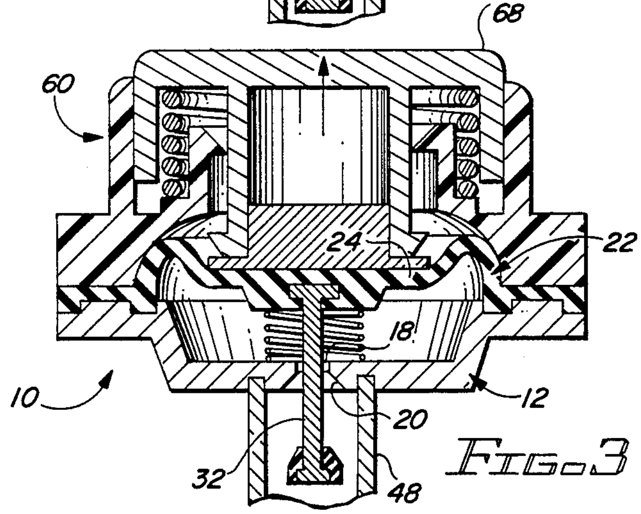
FIG-3
FIG-5
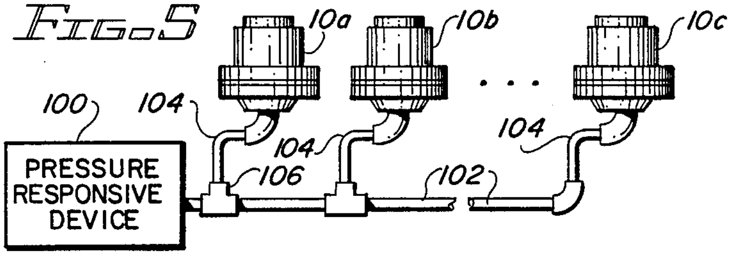
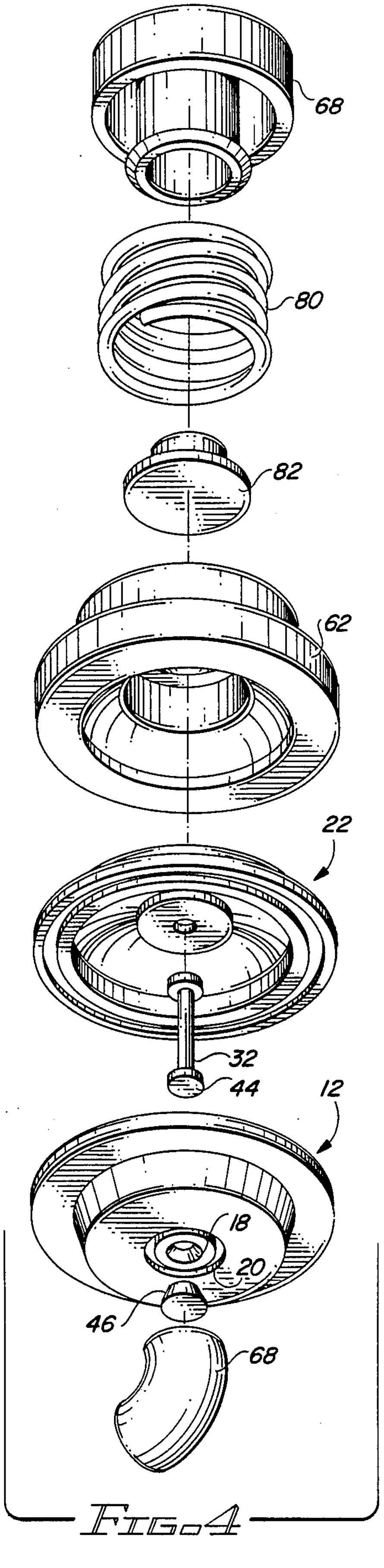
FIG-4

PRESSURE GENERATOR WITH CHECK VALVE

The present invention relates to generators and, more particularly, pressure generators having a check valve for acutating a pressure sensitive device.

Pressure sensitive devices responsive to a pressure rise in an attached conduit may be energized by a pressure generating device in fluid communication with the conduit. Such pressure generating devices may be of many different types, as is well known in the prior art. At some installations, a plurality of pressure generating devices are connected to a common conduit to permit energization of the pressure sensitive device from any one of several different locations. The degree of pressure rise or pressure differential transmitted to the pressure sensitive device is a function of several factors. These factors include: the volume of the conduit in relation to the amount of pressure generated; and, the volumetric change necessary to produce an adequate pressure rise.

For these reasons, it is preferable to minimize the volume represented by the conduit and attached elements in fluid communication therewith in order to maximize the pressure generated by the pressure generating device. Where there are a plurality of pressure generating devices in fluid communication with the conduit, each such device contributes to the volume of the envelope which must be pressurized in order to develop a pressure differential to actuate the pressure sensitive device. It is therefore readily perceivable that the extent of volumetric change necessary to generate and adequate pressure rise is proportional to the volume which must be pressurized in order to energize the pressure sensitive device.

It is therefore a primary object of the present invention to provide a pressure generating device for attachment to a conduit which, in its nonactuated state, is not in fluid communication with the conduit.

Another object of the present inventions is to provide a pressure generator connectable to a conduit which is automatically placed in fluid communication with the conduit on actuation.

Still another object of the present invention is to provide a pressure generator connectable to a conduit which automatically terminates fluid communication with the conduit after being actuated and restored in its original position.

A further object of the present invention is to provide a pressure generator with a rod terminated by a seat having a double function of operating as a check valve when in rest position, and of providing an air passage when activated and synchronized with the movement of the generator such as to allow airflow from the generator into the conduit and to allow a backflow of this air from the conduit into the generator to let the generator restore its original position.

A yet further object of the present invention is to provide a pressure generator attachable to a conduit which is pneumatically segregated by a check valve from the conduit unless the generator valve is actuated.

A still further object of the present invention is to provide a plurality of pressure generators usable in conjunction with a common conduit which do not contribute to dissipation of a pressure rise within the conduit upon actuation of any of the pressure generators.

These and other objects of the present invention will become apparent to those skilled in the art as the description thereof proceeds.

The present invention may be described with greater specificity and clarity with reference to the following drawings, in which:

FIG. 1 is a partial cross section view of the present invention in the quiescent state;

FIG. 2 is a cross sectional view illustrating the operation of the present invention during an intermediate phase of actuation;

FIG. 3 is a cross sectional view illustrating the return of the elements of the present invention to the quiescent state;

FIG. 4 is an isometric view of the major components of the present invention; and FIG. 5 illustrates a plurality of valves in accordance with the present invention connected to a common conduit for operating a pressure sensitive device.

Referring to FIGS. 1 and 2, there is shown a pressure generator 10 for generating a pressure rise within a conduit connectable thereto by forcing air into the conduit on actuation of the pressure generator. The pressure generator includes a base 12, which may be circular in planform and may include a central depression 14 circumscribed by a radial flange 16. An aperture 18, centrally located within depression 14, extends through base 12 and includes a seat 20. A flexible membrane 22 includes a bulbous central section 24 circumscribed by a radial flange section 26. Section 26 may include an annular groove 28 for sealingly receiving a commensurately configured annular protrusion 30 extending from flange 16 to provide an airtight junction therebetween. Other means may be employed for developing an airtight seal, such as convoluted interfacing surfaces and/or adhesives.

A rod 32, which may be made from different materials including resilient ones, is secured to and extends downwardly from the inner surface of section 24 into penetratable engagement with aperture 18. Various means may be employed for securing the rod to section 24, including a flange 36 disposed at the upper end of rod 32 and which flange may be retained in place by overlapping flaps 38, as illustrated. Expansion means, such as coil spring 40, is disposed intermediate base 12 and section 24 to urge membrane 22 into a dome-like configuration. To dissipate the force exerted by this spring upon section 24, central segment 42 of section 24 may be of greater thickness then the remaining part of the section. Lower end 44 or rod 32 includes a stopper 46 for sealingly engaging seat 20 when pressure generator 10 is not actuated. Thereby, the stopper and seat serve as a check valve to preclude flow of fluid through aperture 18 into the space defined by base 12 and membrane 22. A downwardly extending shroud 48 may be secured to base 12 to protect rod 32 during downward excursion of the rod. The lower end of the shroud may include fittings for attachment to a conduit to be connected therewith.

Actuation of membrane 22 may be effected by manually depressing the membrane or having some device exert a force upon the membrane. Upon movement of the membrane in response thereto, rod 32 will extend downwardly against the force of spring 40 and aperture 18 will be opened. The downward movement of membrane 22 will force fluid flow (air flow) from within envelope 50 through aperture 18 and into shroud 48. Envelope 50, in the embodiment illustrated, is primarily defined by base 12 and membrane 22; it is to be understood that the envelope or a chamber may be developed of other materials or in another configuration. Upon cessation of further movement of membrane 22, the air flow through aperture 18 will terminate. On release of the membrane or removal of the force acting thereon, bulbous central section 24, due to its resiliency and flexibility, will attempt to return to its original dome-like configuration. The resulting movement of the bulbous central section will draw air, necessary to return to the quiescent state, through aperture 18 into envelope 50. The return movement of the bulbous central section will be aided by the force of coil spring 40, if used.

Preferably, the length of rod 32 in combination with the location of lower end 44, will have a relationship to the bulbous central section 24 such that the bulbous central section draws stopper 46 against seat 20 with at least a modicum of force to seal aperture 18. Such seal will be enhanced by the resilient force of the membrane, eventually combined with the resilience of the rod and such seal may also be enhanced by the force exerted through coil spring 40.

Depression of central section 24 may be enhanced or made more uniform by employing a push-button assembly 60. The assembly includes a foundation 62 secureable to flange 16 and section 26 to form a unit therewith. The foundation may include an annular surface 64 for matingly supporting an annular curved band on bulbous central section 24 when the latter is in the quiescent state. A sleeve 66 extends upwardly from foundation 62 for locating and guiding push-button 68. A cylinder 70 extends downwardly from the inner upper surface 72 of push-button 68. The lower end of cylinder 70 is terminated by a radially extending flange 74. A cylindrical section 76 includes an inwardly oriented radial flange 78 for interferingly engaging radial flange 74 to limit the upward excursion of push-button 68. A coil spring 80 is disposed intermediate foundation 62 and push-button 68 to exert an upward force upon the push-button. A plunger 82 includes a boss 84 for penetrable engagement with cylinder 70 and on annular flange 86 located adjacent to the lower surface of radial flange 74.

In operation, upon depressing push-button 68, plunger 82 will be displaced downwardly to exert a downward force upon bulbous central section 24. Downward movement of the bulbous central section will produce a commensurate downward movement of rod 32 to open aperture 18 to force air from within envelope 50 through aperture 18 and into shroud 48. On release of push-button 68, spring 80 will cause the push-button to rise to the limit defined by radial flange 78. Commensurately, bulbous central section 24 will resume its quiescent state in response to its own resiliency and the force of coil spring 40, if the latter is used. Simultaneously with upward movement of the bulbous central section, the necessary air to restore the quiescent state will be drawn through aperture 18 into envelope 50 until stopper 46 engages seat 20 to seal aperture 18. It may be noted that any pressure within shroud 48 subsequent to sealing of aperture 18 will not result in any further air flow into envelope 50.

As illustrated in FIG. 2, the extent of downward movement of bulbous central section 34 is a function of the excursion limits of push-button 68 as well as the depth of depression 14 to accomodate the therein extending part of the bulbous central section. Furthermore, the final compression state of coil spring 40 may have a limiting effect upon the extent of downward excursion of the bulbous central section.

FIG. 3 illustrates the fluid communication available through aperture 18 during and synchronized with the return of bulbous central section 24 to its quiescent state. Clearly, FIG. 3 also illustrates the interim position of membrane 22 and rod 32 whether air is being expelled or drawn through aperture 18.

As noted in FIG. 4, shroud 48 is depocted as an elbow 68. If such configuration is employed, the upwardly extending arm thereof must necessarily be of sufficient length to accommodate downward excursion of rod 32, unless it is a flexible resilient rod, without interference therebetween. It is anticipated that in commercial embodiments of the present invention, shroud 48 may take the form of a cylinder having a fitting at the lower end thereof for engagement with a coupling interconnecting pressure generator 10 with a conduit.

FIG. 5 illustrates an environment within which the present invention is particularly adapted. In certain applications, a pressure responsive device 100 must be actuatble from any of a plurality of locations. Each such location includes a device injecting a sufficient volume of air or fluid to generate a pressure rise sufficient to create a pressure differential at the pressure responsive device to energize it. Usually, a conduit 102 is employed to convey the pressure generated. At each of the locations wherefrom the pressure responsive device is to be actuatable is located a pressure generator 10 interconnected with conduit 102 through an hose or pipe 104. A conventional T connection 106 may be employed to interconnect each pipe 104 and conduit 102 and result in a pressure rise within the conduit. This rise in pressure will be transmitted to pressure responsive device 100 to energize it. Because of the segregation of envelope 50 within each of pressure generators **10*b* to 10*x* the volume of fluid injected into conduit 102 by pressure generator 10*a* will not be used in part to increase the pressure within each of envelopes 50 in each of pressure generators 10*b* to 10*x*. Accordingly, the only dissipation of pressure that will occur is that which is directly the result of a small quantity of fluid being forced into each of pipes 104. However, by maintaining conduit 102 and each of pipes 104 of relatively small diameter, the proportion of volume represented by the conduit and these pipes with respect to the air injected therein from envelope 50 of any of one of pressure generators 10*a* to 10*x*, will be relatively substantial and provide a sufficient pressure differential at pressure responsive device 100 to energize it. Thus, it becomes apparent that through incorporation of pressure generator 10 in a system, such as depicted in FIG. 5, a large number of pressure generators may be connected to an extended length of conduit 102 while still maintaining the capability for providing a sufficient pressure differential at the input to pressure responsive device 100** on energization of any of the pressure generators.

Pressure generator 10 will develop a pressure rise above the quiescent pressure present within shroud 48; however, it is to be understood that a chamber, equivalent to envelope 50, from the standpoint of being capable of having its volume varied can be employed to develop a pressure decrease below the ambient pressure present within shroud 48. Such a variant of pressure generator 10 will permit actuation for device 100 which is responsive to a below quiescent pressure and each generator will be segregated from fluid communication with conduit 102 during non-actuation. Accordingly, the term generator, in appropriate context, refers to a mechanism which may be capable of either increasing or reducing with respect to a quiescent state the pressure within shroud 48 and any conduit in fluid communication therewith.

While the principles of the invention have now been made clear in an illustrative embodiment, they will be immediately obvious to those skilled in the art many modifications of structure, arrangement, proportions, elements, materials, and components, used in the practice of the invention which are particularly adapted for specific environments and operating requirements without departing from those principles.

I claim:

1. A pressure generator for pressurizing a conduit in fluid communication with a pressure responsive device, said pressure generator comprising in combination:

(a) a base;

(b) a flexible membrane secured to said base for defining in combination with said base an envelope having a volume commensurate with the state of flex of said membrane;

(c) an aperture disposed in said base, said aperture being the only source of fluid communication with the interior of the envelope, said aperture accommodating both outflow and inflow of fluid between the envelope and the conduit;

(d) a valve for sealing said aperture;

(e) means for opening said valve to accommodate the outflow and inflow of fluid only in response to flexing of said membrane and a commensurate change in volume of the envelope; and (f) means for interconnecting said aperture with the conduit to direct flow of fluid between the envelope and the conduit;

whereby, on flexing of said membrane, fluid is expelled from within the envelope through said valve into the conduit and fluid flow from said conduit through said aperture into the envelope is inhibited unless said membrane is flexed.

2. The pressure generator as set forth in claim 1 wherein said valve includes a stopper and a seat and wherein said opening means includes a rod interconnecting said stopper with said membrane.

3. A pressure generator as set forth in claim 1 including means for flexing said membrane to vary the volume of the envelope.

4. The pressure generator as set forth in claim 3 wherein said flexing means comprises a push-button.

5. The pressure generator as set forth in claim 4 wherein said push-button is positionable in an extended state and in a depressed state and including means for urging said push-button to the extended state.

6. The pressure generator as set forth in claim 5 including means for biasing said valve into the closed position.

7. The pressure generator as set forth in claim 6 wherein said biasing means is disposed intermediate said base and said membrane.

8. The pressure generator as set forth in claim 7 wherein said valve includes a stopper and a seat and wherein said opening means includes a rod interconnecting said stopper with said membrane.

9. The pressure generator as set forth in claim 1 including means for biasing said valve into the closed position.

10. The pressure generator as set forth in claim 9 wherein said biasing means is disposed intermediate said base and said membrane.

11. A pressure generator for injecting a volume of fluid into an attached conduit on actuation, said pressure generator comprising in combination:

(a) means for expelling a volume of the fluid into the conduit on actuating said pressure generator from a quiescent state to an actuated state and for drawing in a volume of fluid from the conduit on deactuating said pressure generator from the actuated state to the quiescent state; and (b) means for inhibiting a flow of fluid through said expelling means only when said pressure generator is in the quiescent state.

12. The pressure generator as set forth in claim 11 wherein said expelling means includes a flexible membrane.

13. The pressure generator as set forth in claim 12 including means responsive to the state of flex of said membrane for actuation said inhibiting means.

14. The pressure generator as set forth in claim 13 further including means for biasing said inhibiting means to prevent flow of fluid through said directing means.

15. The pressure generator as set forth in claim 12 wherein said directing means comprises an aperture.

16. The pressure generator as set forth in claim 15 wherein said inhibiting means comprises a check valve.

17. A method for selectively interconnecting a selected one of a plurality of pressure generators in fluid communication with a pressure sensitive device through a common conduit, said method comprising the steps of:

(a) actuating the selected one of the pressure generators to create a pressure rise in the conduit and to actuate the pressure responsive device;

(b) inhibiting at each of the unactuated pressure generators fluid flow from the conduit to each of the unactuated pressure generators;

(c) deactuating the actuated one of the pressure generators; and (d) accommodating fluid flow from the conduit into the actuated pressure generator during said step of deactuating to absorb within the pressure generator the pressure rise in the conduit resulting from said step of actuating.

18. A generator for altering the pressure in a conduit in fluid communication with a pressure responsive device, said generator comprising in combination:

(a) a chamber having an initial volume when in a quiescent state;

(b) means for varying the volume of said chamber through outflow of fluid from said chamber to the conduit and for returning the volume of said chamber to its quiescent state through inflow of fluid form the conduit into said chamber;

(c) an aperture in fluid communication with the interior of said chamber;

(d) a vlave for sealing said aperture;

(e) means for opening said valve only in response to a change in volume of said chamber from the quiescent state; and (f) means for interconnecting said aperture with the conduit to direct flow of fluid between said chamber and the conduit only when said chamber is in a state other than its quiescent state;

whereby, on varying the volume of said chamber from the volume extant when said chamber is in the quiescent state, a change in pressure within the conduit will be present to act upon the pressure sensitive device and flow of fluid between said chamber and the conduit is inhibited when said chamber is in the quiescent state.

19. A generator as set forth in claim 18 wherein said varying and returning means comprises a flexible membrane and wherein said chamber comprises in combination:

(a) a base; and (b) said flexible membrane secured to said base for defining in combination with said base an envelope;

whereby flexing of said flexible membrane will vary the volume of said envelope to develop a commensurate change in pressure within the conduit.

20. A generator as set forth in claim 19 wherein said opening means comprises a positionable rod interconnected with said flexible membrane, said rod being positionally responsive to the state of flex of said flexible membrane.

* * * * *